(12) United States Patent
Inoguchi (10) Patent No.: US 11,719,950 B2
(45) Date of Patent: Aug. 8, 2023

(54) OBSERVATION APPARATUS

(71) Applicant: CANON KABUSHIKI KAISHA, Tokyo (JP)

(72) Inventor: Kazutaka Inoguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 17/409,550

(22) Filed: Aug. 23, 2021

(65) Prior Publication Data

US 2022/0066228 A1    Mar. 3, 2022

(30) Foreign Application Priority Data

Aug. 28, 2020 (JP) ................. 2020-144484

(51) Int. Cl.
*G02B 27/28* (2006.01)
*G02B 27/14* (2006.01)

(52) U.S. Cl.
CPC ........... *G02B 27/283* (2013.01); *G02B 27/14* (2013.01)

(58) Field of Classification Search
CPC .............................. G02B 27/283; G02B 27/14
USPC .......................................................... 353/20
See application file for complete search history.

(56) References Cited

U.S. PATENT DOCUMENTS

2016/0269698 A1* 9/2016 Gao .................... G03B 21/2066
2019/0025602 A1    1/2019 Qin et al.

FOREIGN PATENT DOCUMENTS

JP            6386210 B1    9/2018

* cited by examiner

*Primary Examiner* — Jerry L Brooks
(74) *Attorney, Agent, or Firm* — Canon U.S.A., Inc. IP Division (57) ABSTRACT

An apparatus includes a display element, and an optical system configured to guide to an exit pupil the display light and external light. The optical system includes a first polarization separating element, a first optical unit, and a second optical unit that includes a half-transmissive reflective surface, a phase plate, and a second polarization separating element. The external light transmits through the first polarization separating element and the second optical unit toward the exit pupil. The display light transmits through the first polarization separating element, is reflected by the first optical unit and the first polarization separating element, is twice reflected by the second optical unit, and travels to the exit pupil. The display light forms an intermediate image in an optical path from the first optical unit to the second optical unit.

20 Claims, 7 Drawing Sheets

OBSERVATION APPARATUS

BACKGROUND OF THE DISCLOSURE

Field of the Disclosure

The aspect of the embodiments relates to an optical see-through type observation apparatus.

Description of the Related Art

U.S. Patent Publication No. 2019/0025602 discloses an optical see-through type observation apparatus that includes a polarization separating element as a combiner disposed in front (outside) of an eyepiece optical system that has another polarization separating element, a phase plate, and a half-transmissive reflective plane. In this observation apparatus, an optical system for observing light from a display element consists of the eyepiece optical system on the observation side of the combiner. Japanese Patent No. 6386210 discloses an observation apparatus that includes an optical element that serves as a lens and is disposed between the combiner and the display element.

The above optical see-through type observation apparatuses use a large combiner in a wide angle scheme. In addition, a focal length of the eyepiece optical system is to be longer than or at least twice as long as a distance between the eyepiece optical system and the combiner. Moreover, the display element is to be larger in the wide angle scheme. Therefore, the above observation apparatuses are likely to be larger and heavier.

SUMMARY OF THE DISCLOSURE

An apparatus according to one aspect of the embodiments includes a display element configured to emit display light to display an image, and an optical system configured to guide to an exit pupil the display light and external light as light from an outside of the apparatus. The optical system includes a first polarization separating element, a first optical unit that includes a reflective surface and has a power for incident light, and a second optical unit that includes a half-transmissive reflective surface, a phase plate, and a second polarization separating element. The optical system causes the external light to transmit through the first polarization separating element and the second optical unit and to travel to the exit pupil. The optical system causes the display light to transmit through the first polarization separating element, to be reflected by the first optical unit and the first polarization separating element, to be twice reflected by the second optical unit, and to travel to the exit pupil. The optical system causes the display light to form an intermediate image in an optical path from the first optical unit to the second optical unit.

Further features of the disclosure will become apparent from the following description of exemplary embodiments with reference to the attached drawings.

DESCRIPTION OF THE EMBODIMENTS

Referring now to the accompanying drawings, a description will be given of embodiments according to the disclosure.

First Embodiment

Figure 1:
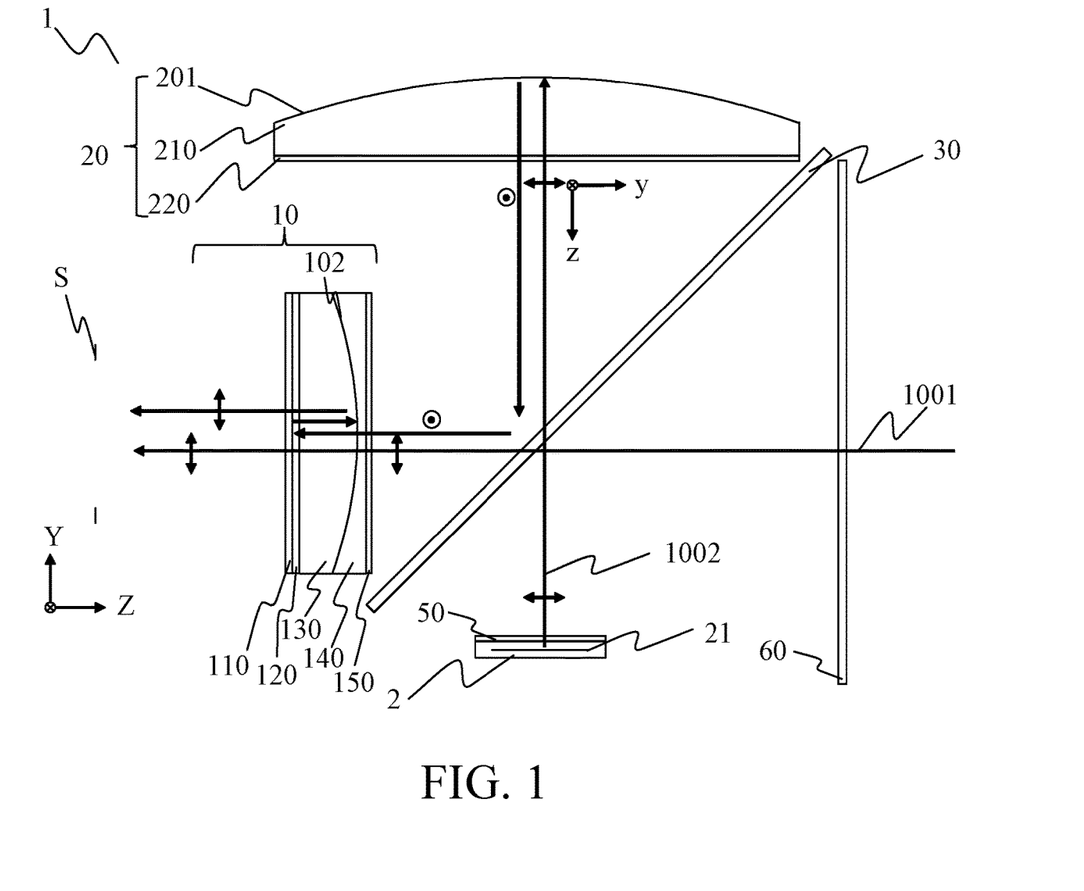
FIG. 1 illustrates a configuration of an observation apparatus according to a first embodiment.

FIG. 1 illustrates a section of an observation apparatus according to a first embodiment of the disclosure. The observation apparatus according to this embodiment includes an optical system 1 and a display element 2. S represents an exit pupil of the optical system 1, where the observer's eye is disposed. The optical system 1 includes in tracing order of display light 1002 emitted from a display plane 21 of the display element 2 such as a liquid crystal panel and an organic EL to an exit pupil S, a first polarizer 50, a first polarization separating element 30, a first optical unit 20 (first polarization separating element 30), and a second optical unit 10.

The first polarizer 50 transmits linearly polarized light in a first polarization direction (referred to as first polarized light hereinafter) parallel to the paper plane of FIG. 1 as illustrated by a double-arrow in FIG. 1. A second polarization separating element 110 reflects linearly polarized light (referred to as the second polarized light hereinafter) in a second polarization direction orthogonal to the first polarization direction and the paper plane of FIG. 1 as illustrated by a bull's eye in FIG. 1.

Figure 7:
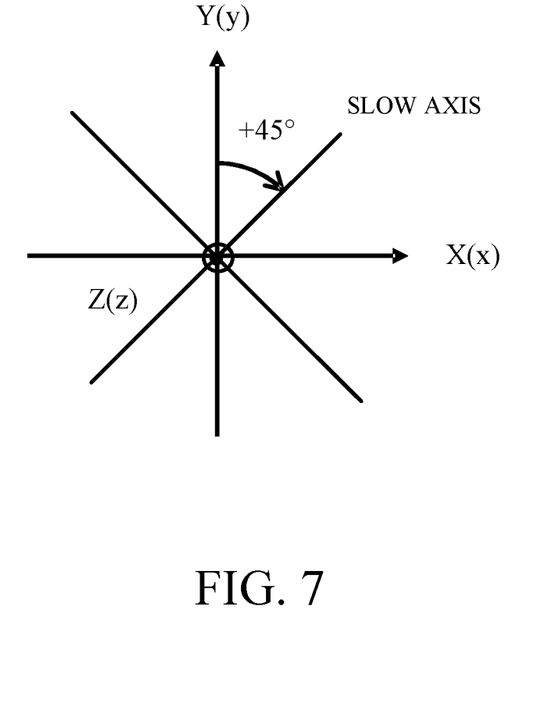
FIG. 7 illustrates a tilt direction of a slow axis of a phase plate in each embodiment.

The first optical unit 20 includes a first phase plate (waveplate, optical element) 220 and a plano-convex lens 210. The first phase plate 220 includes a quarter waveplate having a slow axis tilted by +45° relative to the transmission axis of the first polarized light. As illustrated in FIG. 7, a plus sign of the first optical unit 20 means a direction from a Y-axis toward an X-axis where a traveling direction of the display light is set to ±Z-axis directions in a right-handed XYZ coordinate system in which the section of FIG. 1 is set to the YZ section.

A surface 201 of the plano-convex lens 210 opposite to the first phase plate 220 side is a reflective surface that acts as a concave mirror surface having a reflective film formed on that surface.

The second optical unit 10 includes a second phase plate 150, a plano-concave lens 140, a half-transmissive reflective surface 102, a plano-convex lens 130, a third phase plate 120, and a second polarization separating element 110. The second phase plate 150 is a quarter waveplate having a slow axis that tilts by +45° relative to the transmission axis of the first polarized light. The third phase plate 120 is a quarter waveplate having a slow axis that tilts by −45° relative to the transmission axis of the first polarized light. As illustrated in FIG. 7, the sign in the second optical unit 10 is plus in a direction from the Y-axis to the X-axis and minus in the opposite direction when the traveling direction of the display light is set to the ±Z-axis direction in the right-handed XYZ coordinate system in which the section of FIG. 1 is set to the YZ section.

The plano-concave lens 140 and the plano-convex lens 130 are made of materials (mediums) having refractive indexes that are equal (or close enough to be considered to be equal to each other), and are joined together via a half-transmissive reflective film as the half-transmissive reflection surface 102 provided between the concave and convex surfaces. Similar to the first polarization separating element 30, the second polarization separating element 110 transmits the first polarized light and reflects the second polarized light.

The observation apparatus according to this embodiment has a fourth polarizer 60 at a position which external light 1001 as light from the outside of the observation apparatus (external world) enters. The fourth polarizer 60 transmits the first polarized light of the external light 1001.

In the thus configured observation apparatus, the first polarized light of the external light 1001 from the external world transmits through the fourth polarizer 60 and the first polarization separating element 30, and enters the second optical unit 10. The external light 1001 as the first polarized light is converted into clockwise circularly polarized light by the second phase plate 150 when viewed in the traveling direction of the external light. The external light 1001 as circularly polarized light transmits through the plano-concave lens 140, the half-transmissive reflective surface 102, and the plano-convex lens 130, and is returned to the first polarized light by the third phase plate 120. The external light 1001 as the first polarized light transmits through the second polarization separating element 110 and reaches the exit pupil S. In this way, the external light 1001 transmits through the components of the second optical unit 10 once and reaches the exit pupil S.

In the second optical unit 10, the half-transmissive reflective surface 102 as a curved surface is disposed between the plano-concave and plano-convex lenses 140 and 130 that are made of materials having the same refractive indexes, and therefore has no power for the external light 1001. Thus, the external light 1001 reaches the exit pupil S while receiving no power from the second optical unit 10. Thereby, the external world can be naturally observed.

The display light 1002 as the first polarized light is emitted from the display plane 21 of the display element 2, transmits through the first polarizer 50 and the first polarization separating element 30, and enters the first optical unit 20. The display light 1002 as the first polarized light is converted into clockwise circularly polarized light by the first phase plate 220 when viewed in the traveling direction of the display light (this viewing direction will be similarly applied to the following description). This clockwise circularly polarized light transmits through the plano-convex lens 210, is reflected on the reflective surface 201, and is converted into counterclockwise circularly polarized light. This circularly polarized light again transmits through the plano-convex lens 210, again enters the first phase plate 220, is converted into the second polarized light. The display light 1002 as the second polarized light is reflected by the first polarization separating element 30 and enters the second optical unit 10.

In the second optical unit 10, the display light 1002 as the second polarized light is converted into counterclockwise circularly polarized light by the second phase plate 150 and transmits through the plano-concave lens 140. This display light 1002 transmits through the half-transmissive reflective surface 102 and the plano-convex lens 130, is converted into the second polarized light by the third phase plate 120, and is reflected by the second polarization separating element 110. The reflected display light 1002 as the second polarized light is converted into counterclockwise circularly polarized light by the third phase plate 120. The display light 1002 as circularly polarized light again transmits through the plano-convex lens 130, is reflected on the half-transmissive reflective surface 102, is converted into clockwise circularly polarized light, again transmits through the plano-concave lens 140, and enters the third phase plate 120.

The display light 1002 as clockwise circularly polarized light incident on the third phase plate 120 is converted into the first polarized light. The display light 1002 as the first polarized light transmits through the second polarization separating element 110 and reaches the exit pupil S. In the second optical unit 10, the display light 1002 receives a power that contributes to imaging when reflected on the half-transmissive reflective surface 102.

As described above, the optical system according to this embodiment causes the external light 1001 to transmit through the first polarization separating element 30 and the second optical unit 20 and to travel to the exit pupil. In addition, the optical system causes the display light 1002 to transmit through the first polarization separating element 30, to be reflected by the first optical unit 20 and the first polarization separating element 30, to be twice reflected in the second optical unit 20 and to travel to the exit pupil S. This will be similarly applied to second and third embodiments described later.

In the above optical path of the display light 1002, the reflective surface 201 of the first optical unit 20 has a power that contributes to imaging, and causes the display light 1002 reflected there to form an intermediate image IMI in the optical path from the first optical unit 20 to the second optical unit 10. In other words, the first optical unit 20 constitutes a relay optical system. Then, the second optical unit 10 as the eyepiece optical system causes the observer who placed the eye in the exit pupil S to observe the intermediate image IMI through the optical path in the second optical unit 10.

Forming the optical path of the external light 1001 and the optical path of the display light 1002 as described above superimposes the image displayed on the display element 2 on the external world and enable them to be observed.

An optical path similar to that of this embodiment can be formed even when the third phase plate 120 includes a quarter waveplate having a slow axis that tilts by +45° relative to the transmission axis of the first polarized light, and the second polarization separating element 110 is made to reflect the first polarized light and to transmit the second polarized light.

When the slow axes of the quarter waveplate as the second phase plate 150 and the quarter waveplate as the third phase plate 120 are orthogonal to each other as in this embodiment, coloring can be suppressed when the quarter waveplate has wavelength dependency. Although the first and second polarizers 60 and 50 are not always necessary, providing them can improve the contrasts of the external light and the display light and suppress unnecessary light such as ghosts.

In addition, this embodiment can make compact the optical system 1 that forms the intermediate image IMI, since the optical path from the first polarization separating element 30 to the first optical unit 20 and the optical path from the first optical unit 20 to the first polarization separating element 30 overlap each other.

Moreover, this embodiment configures the reflective surface 201 of the first optical unit 20 as a concave mirror surface, and obtains a strong power even with a surface having a smaller curvature than a transmission surface. In particular, the reflective surface 201 is configured as a back mirror surface to obtain a stronger power even with a surface having a small curvature. Thereby, various aberrations can be suppressed and the first optical unit 20 can be made thinner.

Figure 4:
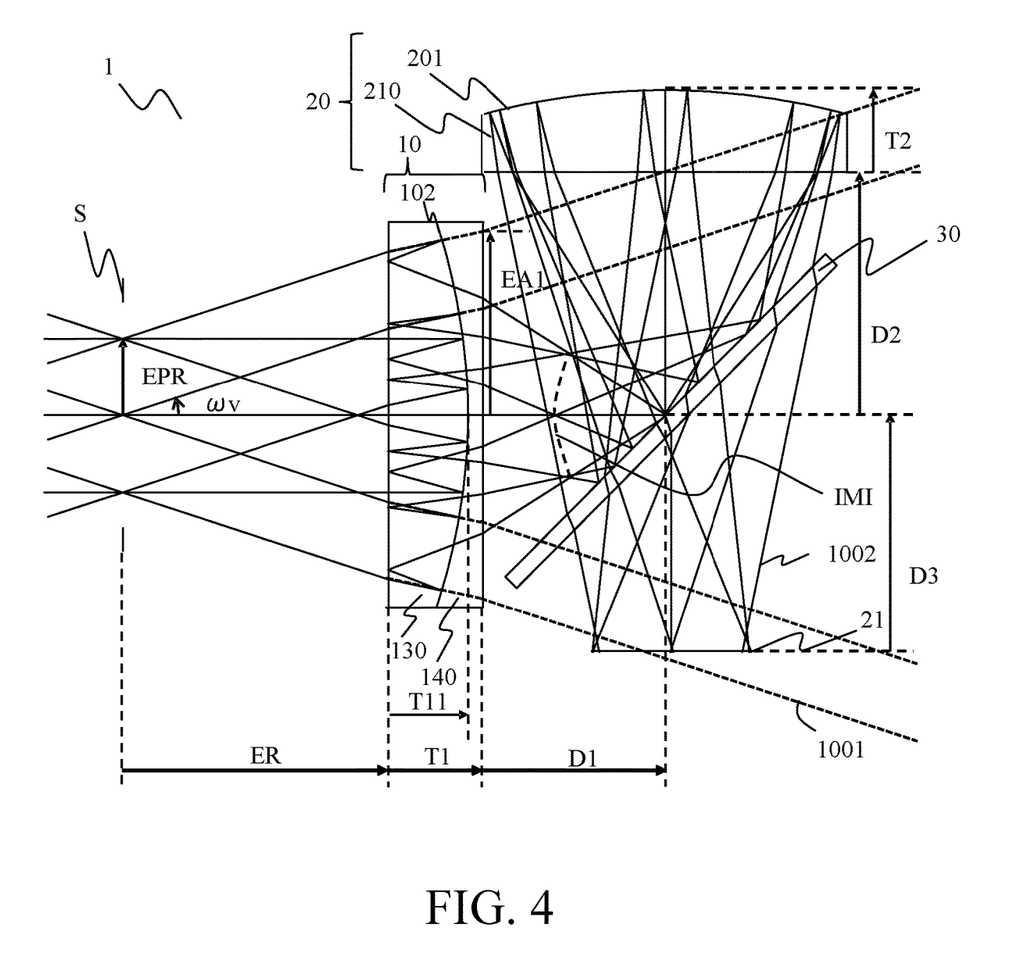
FIG. 4 is an optical path diagram of the observation apparatus according to the first embodiment.

Referring now to FIG. 4, a detailed description will be given of the optical path and imaging of the display light 1002 in this embodiment. FIG. 4 omits some of the components illustrated in FIG. 1. In FIG. 4, ωv represents a half angle of view, and ER represents a distance or an eye relief between the exit pupil S of the optical system 1 and an optical surface closest to the exit pupil in the second optical unit 10. EPR represents a radius of the exit pupil S.

The second optical unit 10 basically includes a cemented lens of the plano-convex lens 130 and the plano-concave lens 140. The following equality is met:

$$EA1=EPR+(ER+T1/N1)\times\tan(\omega v)$$

where N1 is a refractive index of the materials of the plano-convex lens 130 and the plano-concave lens 140, T1 is a thickness of the second optical unit 10 on the optical axis, and EA1 is an effective diameter (radius). Where D1 is a distance between the second optical unit 10 and the first polarization separating element 30 on the optical axis of the second optical unit 10 and satisfies D1≥EA1, almost all of the first polarized light among the light fluxes from the external world at the lower maximum half angle of view of −ωv reaching the exit pupil S can transmit through the first polarization separating element 30. This equality does not always have to be met, but generally D1=EA1 (or ≈EA1) is met and this equality is satisfied.

The following inequality is set in order to avoid interference between the first optical unit 20 and the second optical unit 10:

$$D2>EA1$$

where D2 is a distance on the optical axis of the first optical unit 20 between the first optical unit 10 and the first polarization separating element 30.

US Patent Publication No. 2019/0025602 and Japanese Patent No. 6386210 dispose a display element near the position of the first optical unit 20 in this embodiment. Thus, the focal length f1 of the second optical unit 10 satisfies f1>D1+D2 even if the optical path in the second optical unit 10 is negligible.

On the other hand, this embodiment forms the intermediate image IMI of the image displayed on the display plane 21 in the optical path from the first optical unit 20 to the second optical unit 10. Therefore, the following inequality is satisfied:

$$f1<D1+D2 \quad (1)$$

In particular, this embodiment forms the intermediate image IMI in the optical path from the first polarization separating element 30 to the second optical unit 10. Therefore, the following inequality may be satisfied:

$$(T11+T1)/N1<f1<D1 \quad (2)$$

where T11 is a thickness of the plano-convex lens 130 on the optical axis of the second optical unit 10.

When f1 is lower than the lower limit in the inequality (2), the NA of the intermediate image IMI becomes large, the size of the first polarization separating element 30 or the first optical unit 20 becomes large, and the thickness of the observation apparatus (dimension in the lateral direction in FIG. 4) increases. When f1 is higher than the upper limit in the inequality (2), it is necessary to shorten the focal length (increase the power) of the first optical unit 20 and it becomes difficult to correct various aberrations. Moreover, a distance D3 between the display plane 30 and the first polarization separating element 30 increases, and the height of the observation apparatus increases (dimension in the longitudinal direction in FIG. 4).

The refractive indexes of the materials of the plano-convex lens 130 and the plano-concave lens 140 do not have to be completely the same. An optical power (refractive power) φ102 for light transmitting through the cemented surface 102 between the plano-convex lens 130 and the plano-concave lens 140 is expressed as follows:

$$\varphi 102=(N12-N11)/R102$$

where N11 and N12 are refractive indexes of the materials of the plano-convex lens 130 and the plano-concave lens 140, respectively, and R102 is a radius of curvature of the cemented surface 102. When an absolute value |φ102| of the optical power for the light transmitting through the cemented surface 102 satisfies |Φ102|<0.0001 [1/mm], N12 and N11 may be considered equal to each other. Even if the surfaces of the plano-convex lens 130 and the plano-concave lens 140 have fine curvatures, the overall optical power φ for the light transmitting through each component of the second optical unit 10 once may satisfy |Φ|<0.000125 [1/mm].

Second Embodiment

Figure 2:
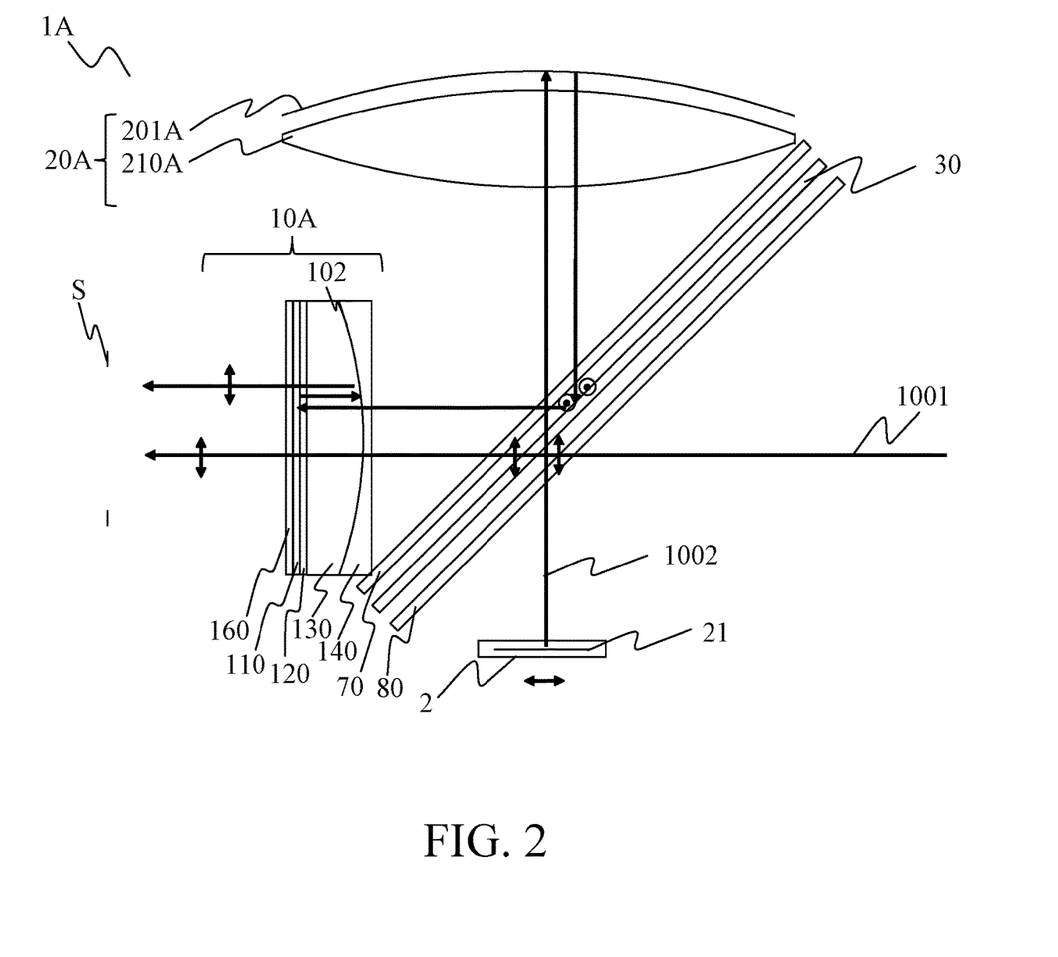
FIG. 2 illustrates a configuration of an observation apparatus according to a second embodiment.

FIG. 2 illustrates a section of an observation apparatus according to a second embodiment of the disclosure. The observation apparatus according to this embodiment includes an optical system 1A and a display element 2. The optical system 1A includes a first polarizer 80, a first polarization separating element 30, a first phase plate 70, a first optical unit 20A, (a first phase plate 70, a first polarization separating element 30), and a second optical unit 10A, in tracing order of display light 1002 emitted from a display plane 21 of the display element 2 to the exit pupil S. Those elements, which are designated by the same reference numerals as those in the first embodiment, are corresponding elements of the first embodiment.

This embodiment removes the first and fourth polarizers 50 and 60 from the optical system 1 of the first embodiment, and disposes the first polarizer 80 on the external world side of the first polarization separating element 30 that serves as a combiner. The first polarizer 80 transmits the first polarized light.

The first optical unit 20A includes a biconvex lens 210A and a reflective surface 201 separate from the biconvex lens 210A. The first phase plate 220 in the first embodiment is not provided. The second optical unit 10A includes the plano-concave lens 140, the half-transmissive reflective surface 102, the plano-convex lens 130, the third phase plate 120, the second polarization separating element 110, and a second polarizer 160. The second optical unit 10A removes the second phase plate 150 from the second optical unit 10 in the first embodiment and include a second polarizer 160 closest to the exit pupil. The second polarizer 160 transmits the first polarized light.

This embodiment disposes a first phase plate (optical element) 70 on the exit pupil side (on the side of the first and second optical units) of the first polarization separating element 30, instead of the first phase plate 220 and the second phase plate 150 in the first embodiment. The first phase plate 70 is a quarter waveplate having a slow axis that tilts by 45° relative to a transmission axis of linearly polarized light in the first direction.

In the thus configured observation apparatus, the first polarized light of the external light 1001 transmits through the first polarizer 80 and the first polarization separating element 30, and enters the first phase plate 70. The external light 1001 as the first polarized light is converted into clockwise circularly polarized light by the first phase plate 70 when viewed in the traveling direction of the external light. The external light 1001 as the circularly polarized light transmits through the plano-concave lens 140, the half-transmissive reflective surface 102, and the plano-convex lens 130, and is returned to the first polarized light by the third phase plate 120. The external light 1001 as the first polarized light transmits through the second polarization separating element 110 and the second polarizer 160 and reaches the exit pupil S. Thus, the external light 1001 transmits through the components of the second optical unit 10A once and reaches the exit pupil S.

Even in this embodiment, similar to the first embodiment, the half-transmissive reflective surface 102 which is a curved surface in the second optical unit 10A is disposed between the plano-concave and plano-convex lenses 130 and 140 made of materials having the same refractive indexes and has no power for the external light 1001. Therefore, the external light 1001 reaches the exit pupil S while receiving no power from the second optical unit 10A. Thereby, the external world is naturally observed.

Of the display light 1002 emitted from the display plane 21 of the display element 2, the first polarized light transmits through the first polarizer 80 and the first polarization separating element 30, and enters the first phase plate 70. The display light 1002 as the first polarized light is converted into clockwise circularly polarized light when viewed in the traveling direction of the display light by the first phase plate 70 (this viewing direction will be similarly applied to the following description). This clockwise circularly polarized light transmits through the biconvex lens 210A, is reflected on the curved reflective surface 201A, and is converted into counterclockwise circularly polarized light. This circularly polarized light again transmits through the biconvex lens 210A, again enters the first phase plate 70, and is converted into second polarized light. The display light 1002 as the second polarized light is reflected by the first polarization separating element 30 and enters the second optical unit 10A.

In the second optical unit 10A, the display light 1002 as the second polarized light transmits through the plano-concave lens 140, the half-transmissive reflection surface 102, and the plano-convex lens 130, is converted into second polarized light by the third phase plate 120, and is reflected by the second polarization separating element 110. The reflected display light 1002 as the second polarized light is converted into counterclockwise circularly polarized light by the third phase plate 120. The display light 1002 as circularly polarized light again transmits through the plano-convex lens 130, is reflected on the half-transmissive reflective surface 102, is converted into clockwise circularly polarized light, again transmits through the plano-convex lens 130, and enters the third phase plate 120.

The display light 1002 as the clockwise circularly polarized light incident on the third phase plate 120 is converted into the first polarized light by the third phase plate 120, and the display light 1002 as the first polarized light transmits through the second polarization separating element 110 and the second polarizer 160, and reaches the exit pupil S. In the second optical unit 10A, the display light 1002 receives a power that contributes to imaging when reflected on the half-transmissive reflective surface 102.

In this embodiment, the second polarizer 160 can improve the contrast of the display light 1002 and reduce the intensity of stray light.

Figure 5:
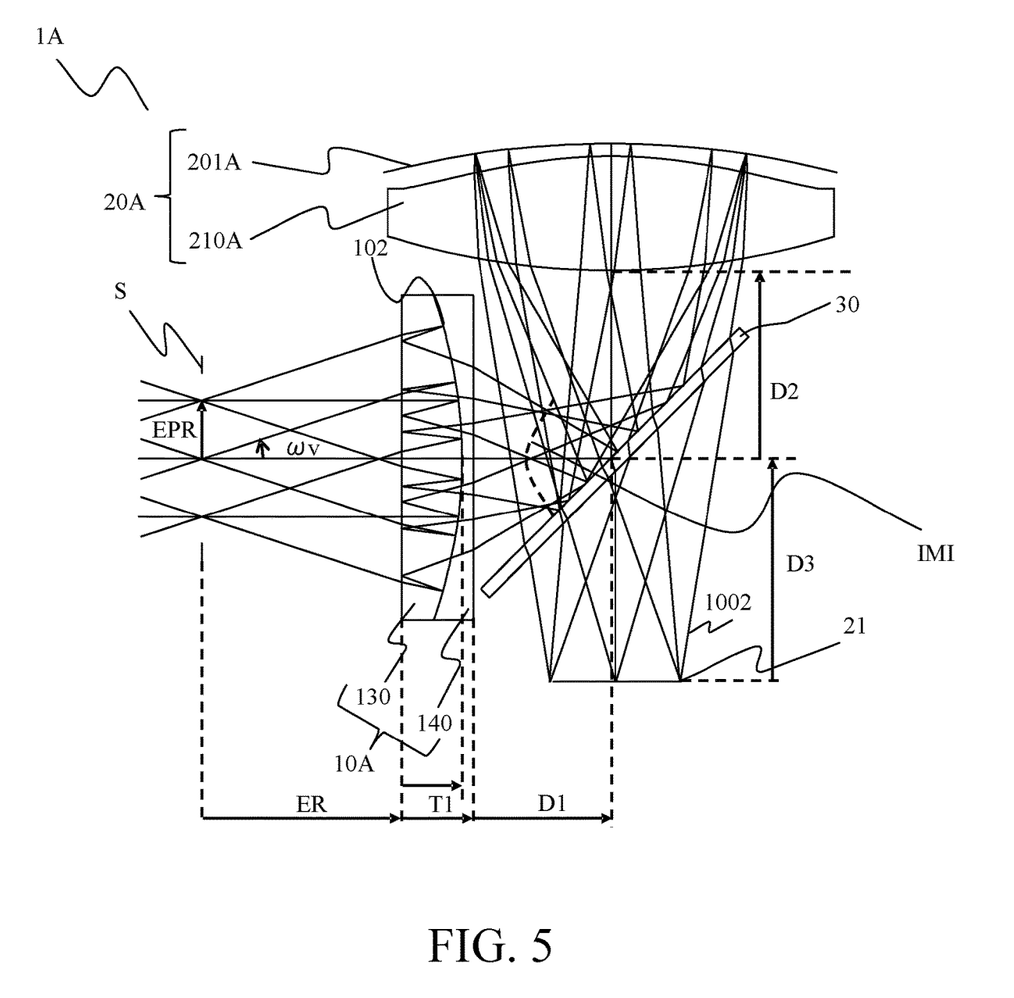
FIG. 5 is an optical path diagram of the observation apparatus according to the second embodiment.

Referring now to FIG. 5, a detailed description will be given of the optical path and imaging of the display light 1002 in this embodiment. FIG. 5 omits some of the components illustrated in FIG. 2. In FIG. 5, ωv, ER, EPR, f1, T1, T11, D1, D2, and D3 have the same meanings as those in the first embodiment.

This embodiment also forms an intermediate image IMI of the image displayed on the display plane 21 in the optical path from the first optical unit 20A to the second optical unit 10A, similarly to the first embodiment. Therefore, the inequality (1) is satisfied.

This embodiment may also satisfy the inequality (2) so that the intermediate image IMI is formed in the optical path from the first polarization separating element 30 to the second optical unit 10A.

Even in this embodiment, the overall optical power φ for the light transmitting through each component in the second optical unit 10A once may satisfy |Φ|<0.000125 [1/mm].

Third Embodiment

Figure 3:
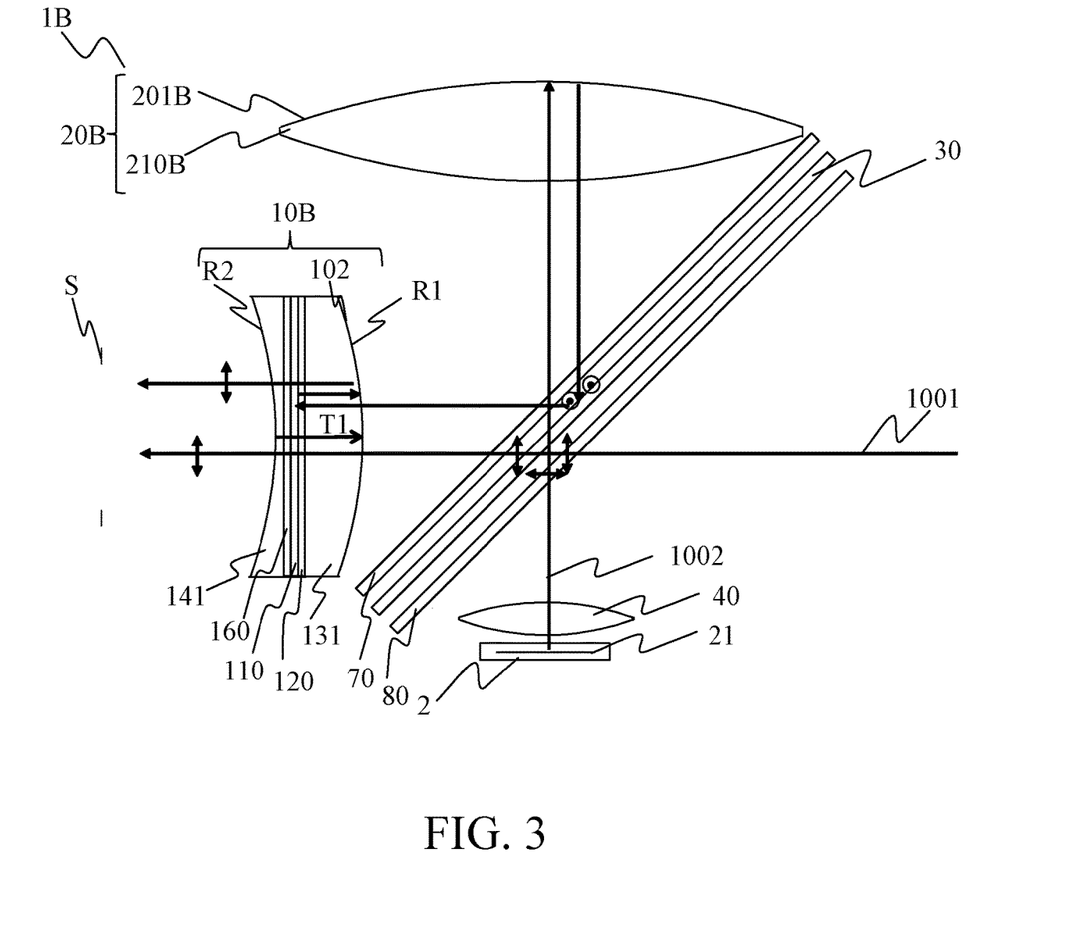
FIG. 3 illustrates a configuration of an observation apparatus according to a third embodiment.

FIG. 3 illustrates a section of an observation apparatus according to a third embodiment of the disclosure. The observation apparatus according to this embodiment includes an optical system 1B and a display element 2. The optical system 1B includes, in tracing order of the display light 1002 emitted from the display plane 21 of the display element 2 to the exit pupil S, a lens 40 as a third lens unit, a first polarizer 80, a first polarization separating element 30, a first phase plate 70, a first optical unit 20B, (a first phase plate 70, a first polarization separating element 30), and a second optical unit 10B. Those elements, which are designated by the same reference numerals as those of the second embodiment, are corresponding elements in the first and second embodiments.

The first optical unit 20B includes a biconvex lens 210B and a reflective surface 201B provided on one surface of the biconvex lens 210B. The lens 40 and the first optical unit 20B form a relay optical system. The second optical unit 10B includes the half-transmissive reflective surface 102, a plano-convex lens 131, the third phase plate 120, the second polarization separating element 110, the second polarizer 160, and a plano-concave lens 141.

In the thus configured observation apparatus, the first polarized light of the external light 1001 transmits through the first polarizer 80 and the first polarization separating element 30, and enters the first phase plate 70. The external light 1001 as the first polarized light is converted into clockwise circularly polarized light by the first phase plate 70 when viewed in the traveling direction of the external light. The external light 1001 as the circularly polarized light transmits through the half-transmissive reflective surface 102 and the plano-convex lens 131, and is returned to the first polarized light by the third phase plate 120. The external light 1001 as the first polarized light transmits through the second polarization separating element 110, the second polarizer 160, and the plano-concave lens 141, and reaches the exit pupil S. In this way, the external light 1001 transmits through the components of the second optical unit 10B once, and reaches the exit pupil S.

In this embodiment, since surfaces R1 and R2 are curved surfaces as the interface between each of the plano-convex lens 131 and the plano-concave lens 141 and air, the external light 1001 receives a refractive power. However, when the light transmits through the two surfaces R1 and R2, the powers cancel each other so that the entire second optical unit 10B has almost no power for the external light 1001. Therefore, the external world can be naturally observed.

Of the display light 1002 emitted from the display plane 21 of the display element 2 and transmitting through the lens 40, the first polarized light transmits through the first polarizer 80 and the first polarization separating element 30, and enters the first phase plate 70. The display light 1002 as the first polarized light is converted into clockwise circularly polarized light by the first phase plate 70 when viewed in the traveling direction of the display light (this viewing direction will be similarly applied to the following description). This clockwise circularly polarized light transmits through the biconvex lens 210B, is reflected on the reflective surface 201B, and is converted into counterclockwise circularly polarized light. This circularly polarized light again transmits through the biconvex lens 210B, again enters the first phase plate 70, and is converted into second polarized light. The display light 1002 as the second polarized light is reflected on the first polarization separating element 30 and enters the second optical unit 10B.

In the second optical unit 10B, the display light 1002 as the second polarized light transmits through the half-transmissive reflective surface 102 and the plano-convex lens 131, is converted into the second polarized light by the third phase plate 120, and is reflected by the second polarization separating element 110. The reflected display light 1002 as the second polarized light is converted into counterclockwise circularly polarized light by the third phase plate 120. The display light 1002 as the circularly polarized light again transmits through the plano-convex lens 131, is reflected on the half-transmissive reflective surface 102, is converted into clockwise circularly polarized light, again transmits through the plano-convex lens 131, and enters the third phase plate 120.

The display light 1002 as the clockwise circularly polarized light incident on the third phase plate 120 is converted into the first polarized light by the third phase plate 120. The display light 1002 as the first polarized light is converted into the first polarized light transmits through the second polarization separating element 110, the second polarizer 160, and the plano-concave lens 141, and reaches the exit pupil S. In the second optical unit 10B, the display light 1002 receives a power when transmitting through the half-transmissive reflective surface 102 due to the refraction, a power when reflected on the half-transmissive reflective surface 102, and a power when transmitting the surface R2 of the plano-concave lens 141, which contributes to imaging due to the refraction.

Figure 6:
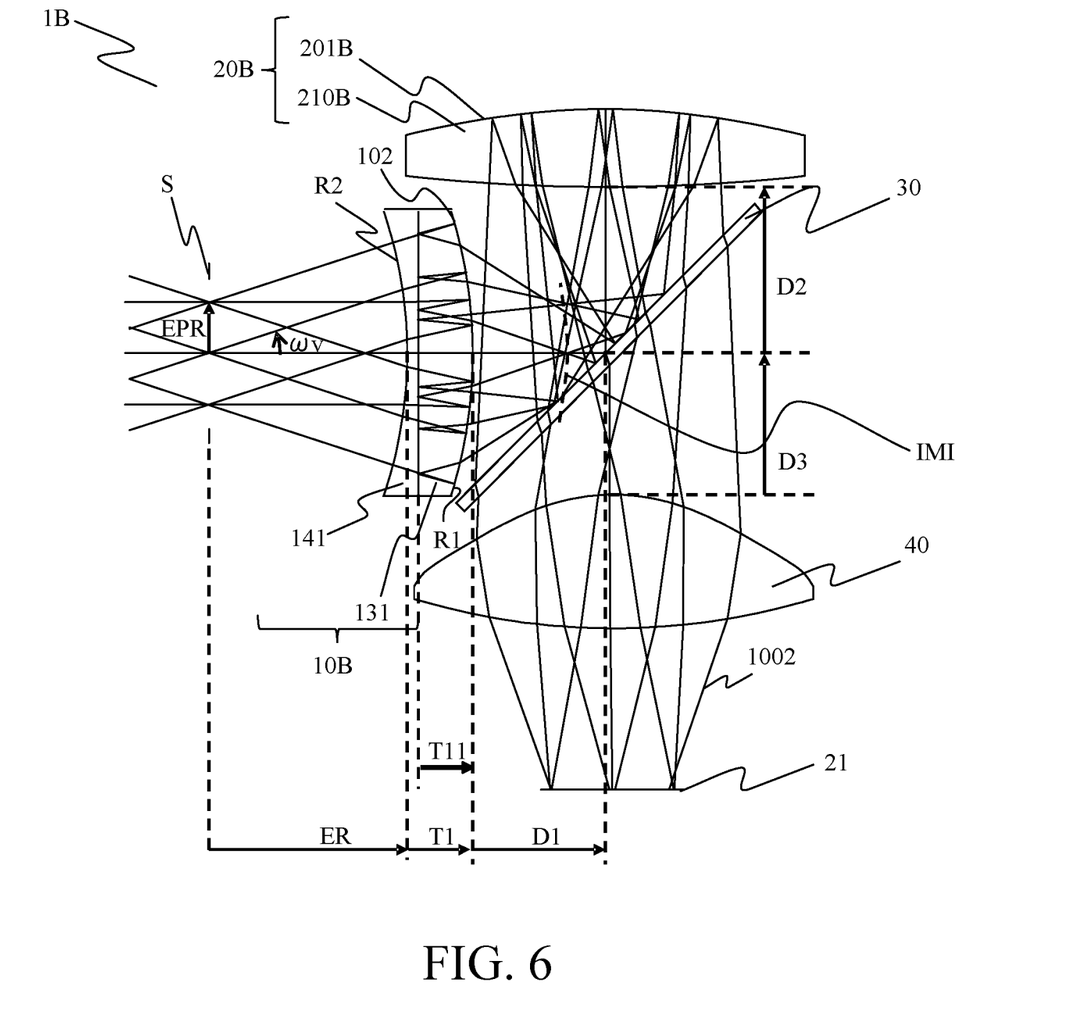
FIG. 6 is an optical path diagram of the observation apparatus according to the third embodiment.

Referring now to FIG. 6, a detailed description will be given of the optical path and imaging of the display light 1002 in this embodiment. FIG. 6 omits some of the components illustrated in FIG. 3. In FIG. 6, ωv, ER, EPR, f1, T1, T11, D1, and D2 have the same meanings as those in the first and second embodiments. However, D3 represents a distance between the lens 40 and the first polarization separating element 30.

This embodiment also forms an intermediate image IMI of the image displayed on the display plane 21 in the optical path from the first optical unit 20B to the second optical unit 10B, similarly to the first and second embodiments. Therefore, the inequality (1) is satisfied.

This embodiment may also satisfy the inequality (2) so that the intermediate image IMI is formed between the first polarization separating element 30 and the second optical unit 10B. This is because, in addition to the reason described in the first embodiment, when the intermediate image IMI is formed between the first polarization separating element 30 and the first optical unit 20B, the diameter of the lens 40 becomes large.

Even in this embodiment, the overall optical power φ for the light that transmits through each component of the second optical unit 10B once may satisfy |Φ|<0.000125 [1/mm].

Each of the above embodiments can realize a compact optical see-through type observation apparatus.

In each of the above embodiments, the entire intermediate image is formed in the optical path from the first polarization separating element to the second optical unit by the display light. However, at least part of the intermediate image may be formed in the optical path from the first polarization separating element to the second optical unit, and another part may be formed in the optical path from the first optical unit to the first polarization separating element.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-144484, filed on Aug. 28, 2020, which is hereby incorporated by reference herein in its entirety.

What is claimed is:

1. An apparatus comprising:
   a display element configured to emit display light to display an image; and
   an optical system configured to guide to an exit pupil the display light and external light as light from an outside of the apparatus,
   wherein the optical system includes:
   a first polarization separating element;
   a first optical unit that includes a reflective surface and has a power for incident light; and
   a second optical unit that includes a half-transmissive reflective surface, a phase plate, and a second polarization separating element,
   wherein the optical system causes the external light to transmit through the first polarization separating element and the second optical unit and to travel to the exit pupil,
   wherein the optical system causes the display light to transmit through the first polarization separating element, to be reflected by the first optical unit and the first polarization separating element, to be twice reflected by the second optical unit, and to travel to the exit pupil, and
   wherein the optical system causes the display light to form an intermediate image in an optical path from the first optical unit to the second optical unit.

2. The apparatus according to claim 1, wherein the following inequality is satisfied:

$$f1 < D1 + D2$$

where f1 is a focal length of the second optical unit, D1 is a distance on an optical axis of the second optical unit between the second optical unit and the first polarization separating element, and D2 is a distance on an optical axis of the optical unit between the first optical unit and the first polarization separating element.

3. The apparatus according to claim 2, wherein the optical system causes the display light to form at least part of the intermediate image in the optical path from the first polarization separating element to the second optical unit.

4. The apparatus according to claim 2, wherein the reflective surface of the first optical unit is a concave mirror surface.

5. The apparatus according to claim 1, wherein the optical system causes the display light to form at least part of the intermediate image in the optical path from the first polarization separating element to the second optical unit.

6. The apparatus according to claim 5, wherein the following inequality is satisfied:

$$f1<D1+D2$$

where f1 is a focal length of the second optical unit, D1 is a distance on an optical axis of the second optical unit between the second optical unit and the first polarization separating element, and D2 is a distance on an optical axis of the optical unit between the first optical unit and the first polarization separating element.

7. The apparatus according to claim 5, wherein the second optical unit includes a lens having a convex surface provided with the half-transmissive reflective surface, and the following inequality is satisfied:

$$(T11+T1)/N1<f1<D1$$

where N1 is a refractive index of a material of the lens, f1 is a focal length of the second optical unit, D1 is a distance on the optical axis of the second optical unit between the second optical unit and the first polarization separating element, T1 is a thickness of the second optical unit on the optical axis, and T11 is a thickness of the lens on the optical axis of the second optical unit.

8. The apparatus according to claim 5, wherein the reflective surface of the first optical unit is a concave mirror surface.

9. The apparatus according to claim 1, wherein first light and the second light are linearly polarized light and have different polarization directions, wherein the optical system causes the external light as the first light to transmit through the first polarization separating element, the half-transmissive reflective surface, the phase plate, and the second polarization separating element and to travel to the exit pupil, and wherein the optical system causes the display light as the first light to transmit through the first polarization separating element, to be reflected on the reflective surface of the first optical unit, to be converted into the second light, to be reflected by the first polarization separating element, to transmit through the half-transmissive reflective surface and the phase plate, to be reflected on the second polarization separating element, to transmit through the phase plate, to be reflected on the half-transmissive reflective surface, to transmit through the phase plate and the second polarization separating element, and travel to the exit pupil.

10. The apparatus according to claim 9, further comprising a polarizer configured to transmit the first light of the external light and the display light going from the outside of the apparatus and the display element to the first polarization separating element.

11. The apparatus according to claim 9, further comprising an optical element configured to convert the first light traveling from the reflective surface of the first optical unit to the first polarization separating element into the second light.

12. The apparatus according to claim 9, further comprising a polarizer configured to transmit the first light on an exit pupil side of the second polarization separating element.

13. The apparatus according to claim 9, wherein the following inequality is satisfied:

$$f1<D1+D2$$

where f1 is a focal length of the second optical unit, D1 is a distance on an optical axis of the second optical unit between the second optical unit and the first polarization separating element, and D2 is a distance on an optical axis of the optical unit between the first optical unit and the first polarization separating element.

14. The apparatus according to claim 13, wherein the optical system causes the display light to form at least part of the intermediate image in the optical path from the first polarization separating element to the second optical unit.

15. The apparatus according to claim 9, wherein the second optical unit includes a lens having a convex surface provided with the half-transmissive reflective surface, and the following inequality is satisfied:

$$(T11+T1)/N1<f1<D1$$

where N1 is a refractive index of a material of the lens, f1 is a focal length of the second optical unit, D1 is a distance on the optical axis of the second optical unit between the second optical unit and the first polarization separating element, T1 is a thickness of the second optical unit on the optical axis, and T11 is a thickness of the lens on the optical axis of the second optical unit.

16. The apparatus according to claim 1, wherein the reflective surface of the first optical unit is a concave mirror surface.

17. The apparatus according to claim 16, wherein the concave mirror surface includes a back mirror surface.

18. The apparatus according to claim 16, wherein the following inequality is satisfied:

$$f1<D1+D2$$

where f1 is a focal length of the second optical unit, D1 is a distance on an optical axis of the second optical unit between the second optical unit and the first polarization separating element, and D2 is a distance on an optical axis of the optical unit between the first optical unit and the first polarization separating element.

19. The apparatus according to claim 18, wherein the optical system causes the display light to form at least part of the intermediate image in the optical path from the first polarization separating element to the second optical unit.

20. The apparatus according to claim 16, wherein the second optical unit includes a lens having a convex surface provided with the half-transmissive reflective surface, and the following inequality is satisfied:

$$(T11+T1)/N1<f1<D1$$

where N1 is a refractive index of a material of the lens, f1 is a focal length of the second optical unit, D1 is a distance on the optical axis of the second optical unit between the second optical unit and the first polarization separating element, T1 is a thickness of the second optical unit on the optical axis, and T11 is a thickness of the lens on the optical axis of the second optical unit.

* * * * *